United States Patent
Skoglund

[11] Patent Number: 5,878,777
[45] Date of Patent: *Mar. 9, 1999

[54] FLOW CONTROL VALVE HAVING VARIABLE FLOW RING AND SEAT CAGE

[76] Inventor: Paul K. Skoglund, 2222 - 79th Ave. NE., Bellevue, Wash. 98004

[*] Notice: The term of this patent shall not extend beyond the expiration date of Pat. No. 5,487,405.

[21] Appl. No.: 670,820
[22] Filed: Jun. 24, 1996

Related U.S. Application Data

[63] Continuation-in-part of Ser. No. 543,385, Oct. 16, 1995, Pat. No. 5,622,204.
[51] Int. Cl.$^6$ ........................................................ G05D 7/01
[52] U.S. Cl. .................................................. 137/504
[58] Field of Search ...................... 137/501, 504

[56] References Cited

U.S. PATENT DOCUMENTS

| | | | |
|---|---|---|---|
| 2,584,418 | 2/1952 | Branson | 137/504 |
| 2,800,141 | 7/1957 | Hedland | 137/504 X |
| 3,643,685 | 2/1972 | Hays | 137/501 |
| 5,487,405 | 1/1996 | Skoglund | 137/501 |

Primary Examiner—Stephen M. Hepperle
Attorney, Agent, or Firm—Seed and Berry LLP

[57] ABSTRACT

A valve comprises a valve body having an inlet and an outlet defining a flow passage through the valve body. A piston is mounted in a bore intersecting the flow passage and the piston divides the bore into first and second chambers. The piston remains substantially motionless during upstream pressure fluctuations after the desired fluid flow rate through the valve has been established. Springs in the second chamber bias the piston against the fluid pressure from the first chamber. A sleeve on the piston is configured to variably sheath a cover over the outlet such that reciprocation of the piston during initiation of fluid flow through the valve varies the effective area of openings in the cover to achieve the desired differential pressure across the flow control throttle, thus setting the flow rate constant unless the throttle position is changed. The equilibrium flow rate can be altered through variation of fluid flow between the piston and the valve body by a bladder ring which is inflated or deflated by an elastomeric ring which is deformed by liquid or structural forces, or by a metal or plastic ring that is circumferentially variable by mechanical actuators.

23 Claims, 16 Drawing Sheets

FLOW CONTROL VALVE HAVING VARIABLE FLOW RING AND SEAT CAGE

CROSS-REFERENCE TO RELATED APPLICATIONS

This application is a continuation-in-part of U.S. patent application Ser. No. 08/543,385 filed Oct. 16, 1995, entitled "Flow Control Valve Having Flow Adjustable by Variable Ring".

BACKGROUND OF THE INVENTION

The present invention relates to constant fluid flow regulators and more particularly to a flow regulator having a spring biased piston and being capable of maintaining a constant fluid flow rate in both high pressure, low volume and low pressure, high volume environments with changes in inlet or outlet pressure. The present invention also accommodates high pressure, high volume and low pressure, low volume systems. Most prior art constant fluid flow regulators vary fluid flow through the piston by movement of the piston that varies the flow pressure through this piston or by change in the spring tension. More specifically, constant fluid flow regulators taught in the prior art regulate fluid flow by adjustment screws that directly vary spring tension by attachment to the piston spring itself. Other regulators change fluid flow by altering piston position via springs and ball bearings located over the piston. The system employing springs and ball bearings is subject to extreme torque due to the fluid pressure in the chamber.

Additionally, multiple poppet type valves may be used for low pressure, high volume fluid flow regulation. The above prior art, however generally cannot accommodate high pressure, low volume fluid flow. This invention, on the other hand, is able to provide constant fluid flow in high or low pressure and high or low volume ranges. The present invention is also different from the above sliding sleeve and multiple poppet type valves in that the piston of the valves of the prior art move relative to the valve body to vary fluid flow as the pressure changes, while the piston of the present invention does not move substantially relative to the valve body after fluid flow has stabilized. Instead, constant spring force on the piston in the present invention allows constant pressure across the piston, therefore the flow is constant. The present invention thus experiences less wear and tear from moving parts.

Furthermore, U.S. Pat. No. 4,893,649 issued to Skoglund and U.S. Pat. No. 3,958,596 issued to Gerrard both disclose valves in which fluid flow variation is implemented by an adjustable valve seat. Adjustment of the valve seat adjusts the spring tension, which in turn alters the pressure differential across the piston. However, both of the above prior art patents employ threaded, screw-type mechanisms for adjusting the valve seat which are difficult to operate, have a narrow operating range, and are prone to breakage in high pressure environments.

Also, the screw-type valve seat adjustment mechanisms of the above prior art references both impede fluid flow through the valve. U.S. Pat. No. 4,893,649, discloses a valve in which the fluid outlet is oriented perpendicular to the fluid inlet in order to accommodate the valve seat adjustment mechanism. This angled fluid flow pathway results in a more complex valve design as well as increased fluid turbulence and higher pressure drops. U.S. Pat. No. 3,958,596 issued to Gerrard teaches a valve in which the fluid outlet passes axially through the valve seat adjustment screw. This valve seat adjustment mechanism configuration is difficult to use while the valve is in operation.

The constant flow rate controller valves discussed in U.S. Pat. Nos. 5,143,116 and 5,234,025, both issued to Skoglund, operate based on the following force balance equations.

$$P_1 A_{piston} = P_2(A_{piston} - A_{pin}) + KX + P_3 A_{pin}$$

Where
$P_1$=pressure in the first chamber
$A_{piston}$=surface area of the piston
$P_2$=pressure in the second chamber
KX=spring force of the springs
$A_{pin}$=surface area of the piston pin which mates with the seat
$P_3$=pressure at the outlet port Rearrangement of terms produces the following equations:

$$P_1 A_{piston} = P_2 A_{piston} - P_2 A_{pin} + KX + P_3 A_{pin}$$
$$(P_1 - P_2)A_{piston} = KX - P_2 A_{pin} + P_3 A_{pin}$$

$$\Delta P = P_1 - P_2 = \frac{KX - P_2 A_{pin} + P_3 A_{Qpin}}{A_{piston}}$$

Because $A_{pin}$ is small in comparison to $A_{piston}$, and assuming $P_3$ equals the flow pressure at the outlet port, the following equations characterize the force balance existing in these inventions.

$KX=(P_1-P_2)A_{piston}+P_2A_{pin}-P_3A_{pin}$ ($P_2A_{pin}$ and $P_3A_{pin}$ being relatively small in size)

$KX \approx (P_1-P_2)A_{piston}$

Thus, the differential pressure $(P_1-P_2)$ is a function of spring force (KX), but is not precisely equal to spring force (KX).

The flow rate of water, for example, through a control valve is defined by the following equation:

$$Q = C_v \sqrt{\Delta P/sg}$$

Where
$\Delta P=P_1-P_2$
Q=flow rate
$P_1$=pressure in the first chamber
$P_2$=pressure in the second chamber
$C_v$=flow resistance across the orifice
Sg=Specific gravity of fluid Note that because differential pressures $(P_1-P_2)$ is a function of spring force (KX), flow rate (Q) is also a function of spring force. Thus, these constant flow rate controller valves have a constant flow as long as spring force remains constant. This flow is constant regardless of the flow pressure at the inlet port. However, there is a pressure force exerted on the piston pin which mates with the valve seat, and against the remainder of piston defined by $$P_3 \cdot A_{pin}$$

Where
$P_3$=pressure at the outlet port
$A_{pin}$=surface area of the piston pin The above force must be minimized for these valves to function pressure independently. Therefore, for the valves to function, the surface area of the piston pin must be small when compared to the surface area of the piston as a whole.

Note that this force would not be small and the flow rate would not be constant if the area of the piston pin was not small in value when compared to the surface area of the piston as a whole. These valves therefore can have a limited number of different configurations, and must usually be relatively large.

However, in this invention the following equations apply:

$P_1 A_1 = P_2 A_2 + KX$ $A_1 = A_2$ $P_1 A_1 - P_2 A_1 = KX$ $(P_1 - P_2) A_1 = KX$ $P_1 - P_2 = \dfrac{KX}{A_1}$ The area of the outlet $A_3$ and outlet pressure $P_3$ are no longer factors in the balance equation on the underside of the piston. These forces are transferred to the body and not to the piston. Therefore the $P_1-P_2$ valve across the piston and control surfaces is not impacted by $P_3$ and $A_3$. This is a change from the prior art.

SUMMARY OF THE INVENTION

A valve comprises a valve body having an inlet and an outlet defining a flow passage through the valve body. A piston is mounted in a bore intersecting the flow passage and the piston divides the bore into first and second chambers. The piston remains substantially motionless during upstream pressure fluctuations after the desired fluid flow rate through the valve has been established. Springs in the second chamber bias the piston against the fluid pressure from the first chamber. A sleeve on the piston is configured to variably sheath a cover over the outlet such that reciprocation of the piston during initiation of fluid flow through the valve varies the effective area of openings in the cover to achieve the desired pressure across the piston. The sleeve locates such that a force balance is achieved on the piston between the first and second chambers set by the piston spring to cause equilibrium.

The equilibrium flow rate can be altered through variation of fluid flow between the piston and the valve body by a bladder ring which is inflated or deflated by an elastomeric ring which is deformed by liquid or structural forces, or by a metal or plastic ring that is circumferentially variable by mechanical actuators.

In operation, the piston is initially spring biased toward the top portion of the valve. Fluid flowing into the controller valve via the inlet port passage increases the pressure in the chamber above the piston, forcing the piston sleeve over the outlet cover. The piston sleeve thus blocks the outlet cover openings, preventing fluid flow to the outlet port. The pressure in the chamber below the piston builds as fluid enters through the openings in the piston sleeve until the pressure force in this lower chamber plus the piston spring force is greater than the pressure force in the chamber above the piston. The piston then lifts the sleeve from at least a portion of the outlet cover, and at least a partial fluid pathway through the cover openings to the outlet orifice is opened. An equilibrium flow rate is reached (i.e., when the pressure forces in the upper chamber equals the pressure forces in the lower chamber plus the spring force) by variation in the piston position based on the interaction of the above fluid pressure forces and spring force.

Importantly, after the desired flow rate has been attained, the piston no longer moves substantially relative to the valve body unless fluid flow is altered by the valve's flow throttle. Minute movement of the piston does occur when there is a pressure change across the valve, but this piston movement only sets the pressure differential across the piston, and does not directly change the flow rate through the valve. Instead, constant flow rate is maintained despite pressure changes because the spring force maintains a constant pressure differential pressure between the two valve chambers, and not by piston sleeve movement relative to the outlet cover.

DESCRIPTION OF THE DRAWINGS

A more complete appreciation of the invention may be had by reference to the accompanying drawing illustrating a preferred embodiment of the invention to be described in detail, wherein.

DESCRIPTION OF THE PREFERRED EMBODIMENT

Figure 1:
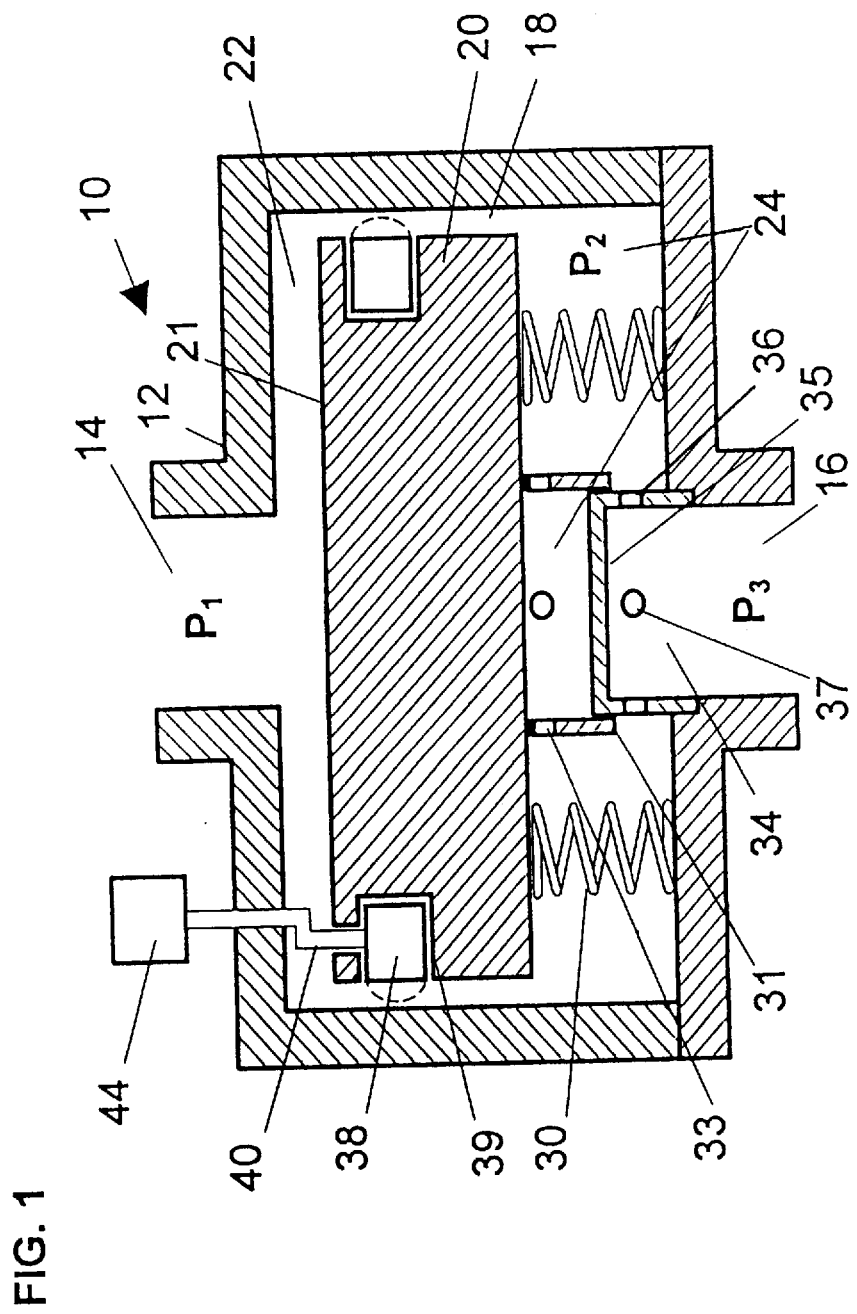
FIG. 1 is a cross-sectional view of a first embodiment of the present invention.

Referring to the FIGS. 1 through 16, the reference numeral 10 indicates the constant flow rate controller valve, as a whole. Valve 10 has a valve body 12 having at its top portion an inlet port 14, and having at its bottom portion an outlet port 16. A bore 18 is formed within valve body 12.

A piston 20 having a head 21 is disposed within bore 18 such that a portion of bore 18 is divided into chamber 22 above piston head 21 and chamber 24 below piston 20. Piston 20 is preferably of a generally cylindrical configuration.

Within chamber 24 are springs 30 which contact piston 20 and bias piston 20 upwardly toward chamber 22. Springs 30 may be coil type springs for example. By employing coil type springs for springs 30, the desired differential pressure ($P_1-P_2$) across the piston (chambers 22 and 24) may be conveniently altered by changing the spring force. The differential pressure across the piston stabilizes after flow is adjusted with the variable ring means discussed below and constant flow is achieved. The valve is then pressure independent at the new flow setting, and piston 20 no longer moves substantially even if the upstream pressure does fluctuate.

Referring again to piston 20, sleeve 31 is connected under piston head 21 in chamber 24, and is preferably tubular. Sleeve openings 33 are one or more in number and are preferably radially disposed around sleeve 31. Sleeve openings 33 allow fluid to enter sleeve 31 of piston 20 and impart fluid pressure $P_2$ on area $A_2$ of piston head 21 in chamber 24.

Cover 34 is located over outlet port 16, and resides in chamber 24. Cover 34 is preferably cylindrical, having top 35 and sides 36. Cover openings 37 are one or more in number and are preferably radially disposed on sides 36 of cover 34. Cover openings 37 allow fluid to exit outlet port 16 from chamber 24.

Sleeve 31 is aligned in registration with cover 34 such that cover 34 guides reciprocation of piston 20 during initiation of fluid flow through valve 10. This reciprocation of piston 20 occurs only until the desired differential pressure set by springs 30 is established, after which piston 20, and sleeve 31 thereof, remain substantially motionless regardless of the occurrence of upstream fluid pressure fluctuations. If there is a pressure change across the valve (i.e., $P_1-P_3$), then there is a small movement of the piston 20 to rebalance the pressure differential ($P_1-P_2$) which is set by the springs 30. However, flow does not change even though sleeve 31 alters its sheathing of cover openings 37. The valve 10 has to take the full pressure drop across it ($P_1-P_3$). The springs 30 set the differential pressure across the variable ring means discussed below ($P_1-P_2$). The rest of the pressure drop must be taken by the sleeve 31 and cover 34. If the pressure $P_1$ increases, the sleeve 31 and cover 34 must take the additional pressure drop across the valve 10 since the pressure differential across the variable ring means has not changed. By definition, if the sleeve 31 and cover 34 are to take this higher pressure drop, the flow area through openings 37 must have decreased if the flow rate has not changed. As piston 20 reciprocates in bore 18 when fluid flow through valve 10 is initially being established, sleeve 31 variably sheaths cover 34 thereby varying the effective fluid flow area through cover openings 37 to achieve the desired pressure differential across the piston. While sleeve 31 has been described as tubular and cover 34 as cylindrical, these two components may have any shape as long as sleeve 31 variably sheaths cover 34 to alter the effective fluid flow area of cover openings 37.

The constant flow rate controller valve 10 operates based on the following force balance equations.

$$P_1A_1 = P_2A_2 + KX$$

Where
$P_1$=pressure in chamber 22
$A_1$=surface area of piston head 21 in chamber 22
$P_2$=pressure in chamber 24
KX=spring force of springs 30
$A_2$=effective surface area of piston head 21 in chamber 24

It is important to note that, unlike prior art valves, the area ($A_3$) of outlet port 16 and the outlet pressure ($P_3$) thereof are not part of the force balance equation of the present invention because cover 34 over outlet port 16 transfers the force defined by ($P_3$)·($A_3$) to body 12 of valve 10, and not to piston 20, as in prior art valves.

Since $A_1=A_2$, rearrangement of terms produces the following equations:

$$P_1A_1 - P_2A_1 = KX$$

$$(P_1-P_2)A_1 = KX$$

$$P_1 - P_2 = \frac{KX}{A_1} = \Delta P$$

The flow rate of water, for example, through the constant flow rate controller valve 10 is defined by the following equation:

$$Q = C_v \sqrt{\Delta P / sg}$$

Where
$\Delta P = P_1 - P_2$
Q=flow rate
$P_1$=pressure in chamber 22
$P_2$=pressure in chamber 24
$C_v$=flow resistance
Sg=Specific gravity of fluid Note that because differential pressures ($P_1-P_2$) is a function of spring force (KX), flow rate (Q) is also a function of spring force. Thus, the constant flow rate controller valve 10 has a constant flow as long as ($P_1-P_2$) across the variable ring means remains constant. This flow is constant regardless of the flow pressure at inlet port 14 and outlet port 16.

The constant flow rate controller valve 10 operates as follows. Fluid passes through inlet port 14, around piston 20, and enters chamber 22. Piston 20, which is biased by springs 30 towards chamber 22, is pushed toward chamber 24 by the increased pressure in chamber 22, such that sleeve 31 blocks outlet cover openings 37, preventing fluid flow to outlet port 16. Chamber 24 is thus sealed.

Fluid flows into chamber 24 through sleeve openings 33 of piston sleeve 31 such that pressure $P_2$ is ultimately achieved on the bottom position of piston 20 in chamber 24. When the flow pressure forces in chamber 24 plus the spring force (KX) of spring 30 exceeds forces caused by the pressure in chamber 22, piston 20 is pushed towards chamber 22, piston sleeve 31 is lifted from at least a portion of outlet cover 34 such that at least a partial fluid pathway through cover openings 37 to outlet port 16 is opened. A piston equilibrium position is next attained when the forces on piston 20 in chamber 22 equals the forces on piston 20 (which includes the spring force on spring 30) in chamber 24.

The above piston equilibrium position also provides the desired pressure differential across the variable ring means, the desired flow rate being set by the variable ring means, which alters the flow resistance $C_v$. Without further substantial change in the position of piston 20, the flow rate will remain constant despite pressure changes across the valve because the spring force of springs 30 maintains a constant pressure differential between chamber 22 and chamber 24 and reference pressure fluid passage 26. Thus, piston 20 moves substantially during initiation of fluid flow through valve 10 or when the variable ring means is altered. However, when there is a pressure change across the valve 10, piston 20 will only move minutely to set the pressure differential ($P_1-P_2$) across piston 20 which, in turn, sets the flow rate; but this movement of piston 20 does not directly change the flow through valve 10.

Figure 2:
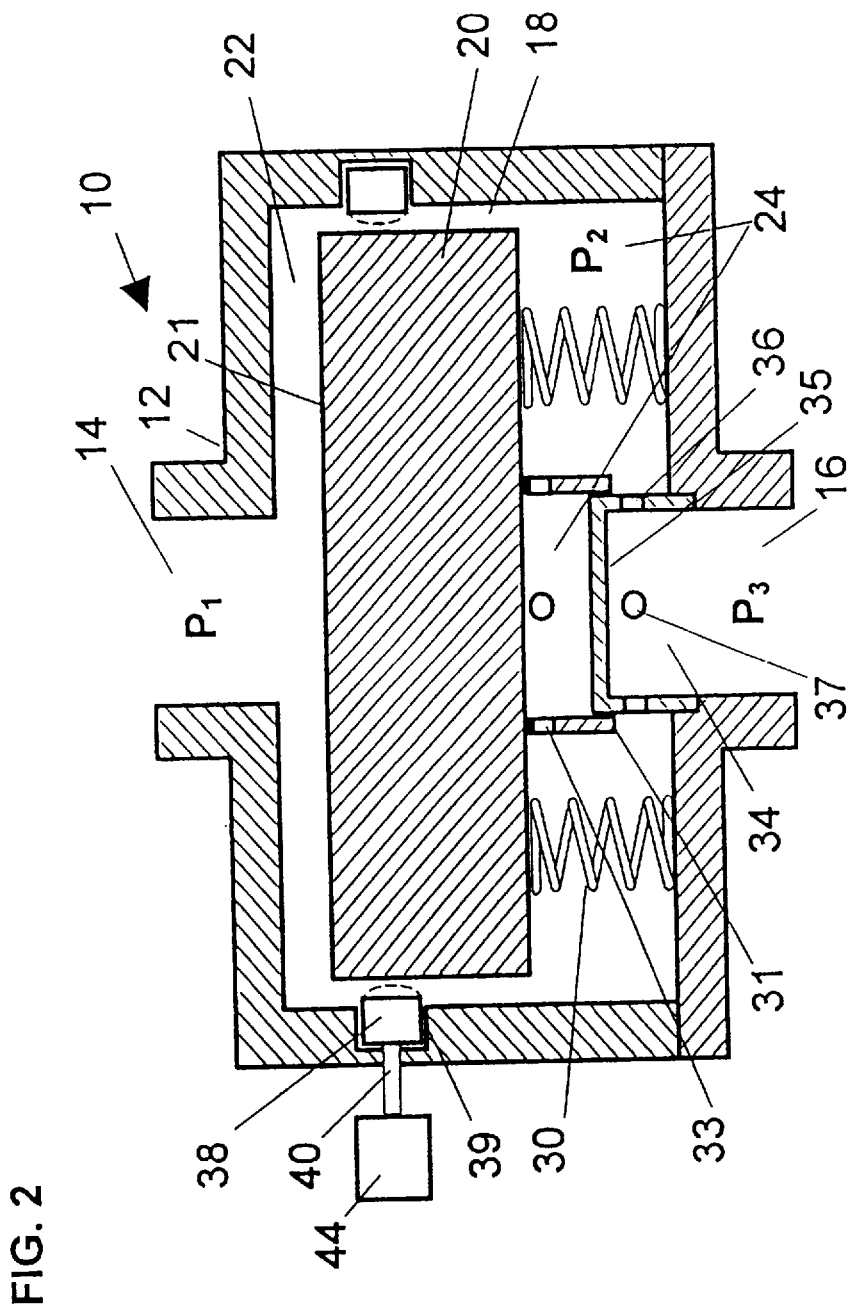
FIG. 2 is a cross-sectional view of a second embodiment of the present invention.

The various exemplary embodiments of the variable ring means for fluid flow rate control are next described. Referring to FIGS. 1–2, a ring-shaped inflatable bladder 38 is circumferentially disposed in recess 39 around the outer walls of piston 20 (FIG. 1), or the inner walls of body 12 (FIG. 2). Inflatable bladder 38 is preferably comprised of a resilient natural or synthetic polymer such as, for example, SBR rubber, polychloroprene, EPDM, or neoprene. Fluid line 40 connects inflatable bladder 38 to fluid source 44. Fluid source 44 provides pressurized fluid, such as, for example, air, oxygen, or water, to inflatable bladder 38. The increased pressure within inflatable bladder 38 results in expansion of inflatable bladder 38. Inflatable bladder 38 can only expand in one direction, i.e. into the flow path between the inner walls of body 12 and the outer walls of piston 20 because inflatable bladder 38 is fitted with the aforesaid recess 39. As the circumference of inflatable bladder 38 is increased or decreased based on the pressure in inflatable bladder 38, as regulated by fluid source 44, fluid flow through the orifice 26 or between the inner walls of body 12 and the outer walls of piston 20 is varied.

Figure 3:
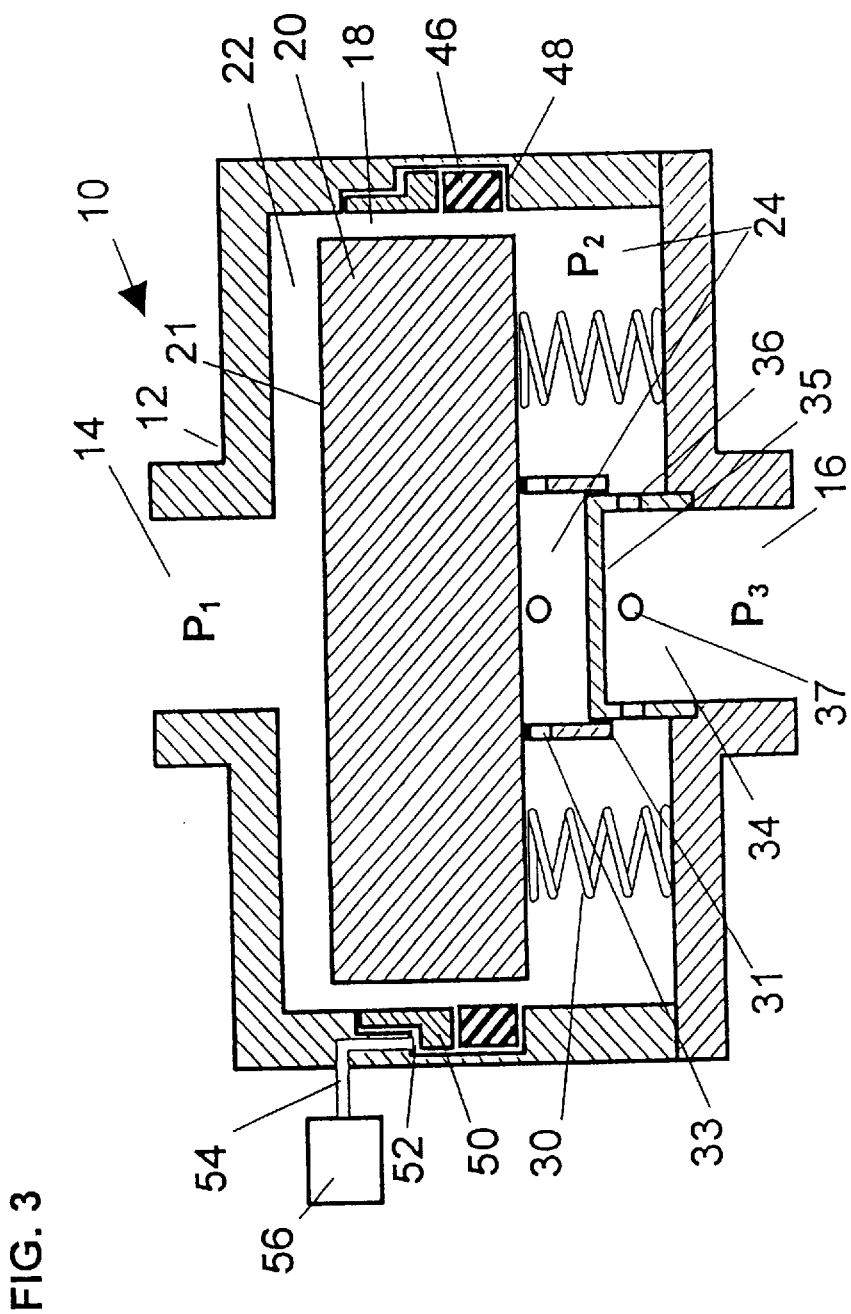
FIG. 3 is a cross-sectional view of a third embodiment of the present invention.
Figure 4:
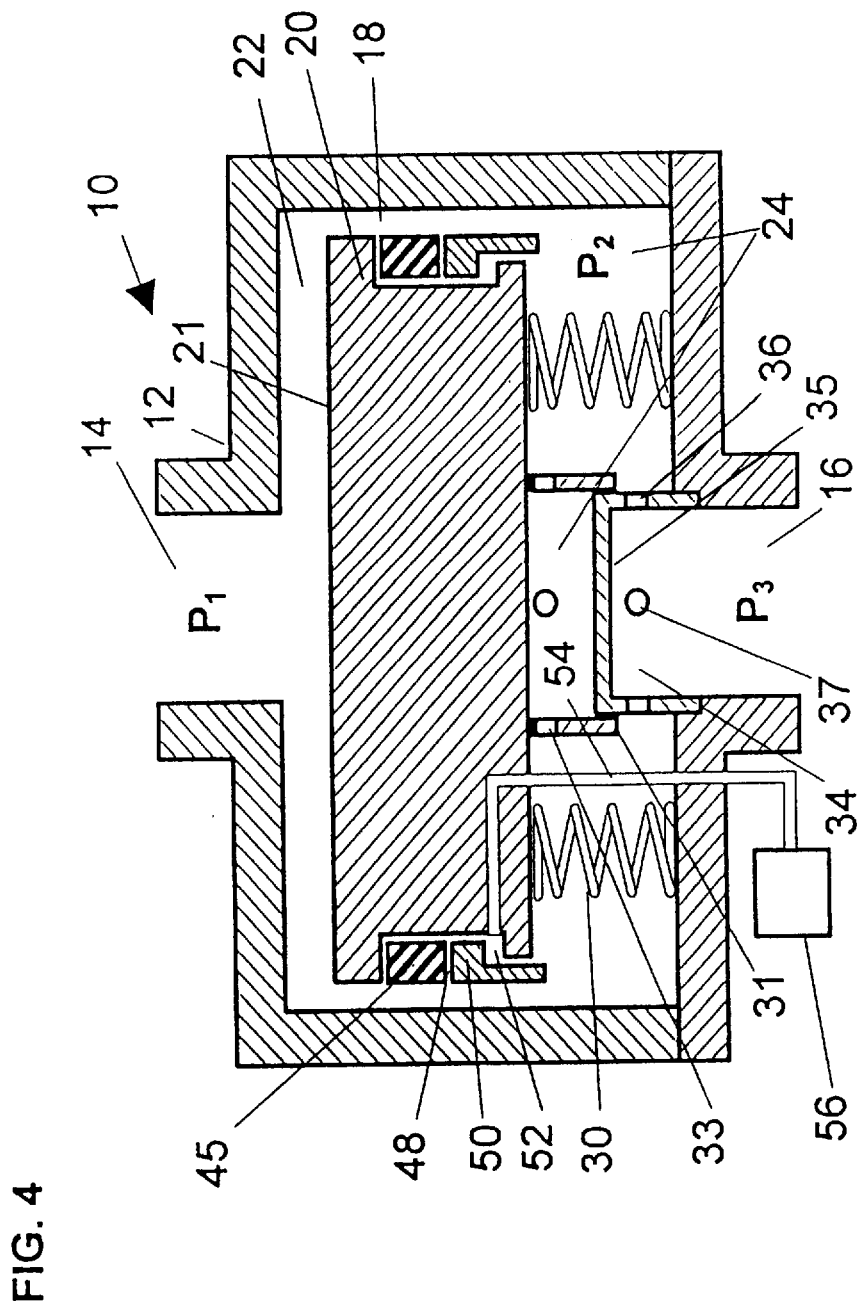
FIG. 4 is a cross-sectional view of a fourth embodiment of the present invention.
Figure 5:
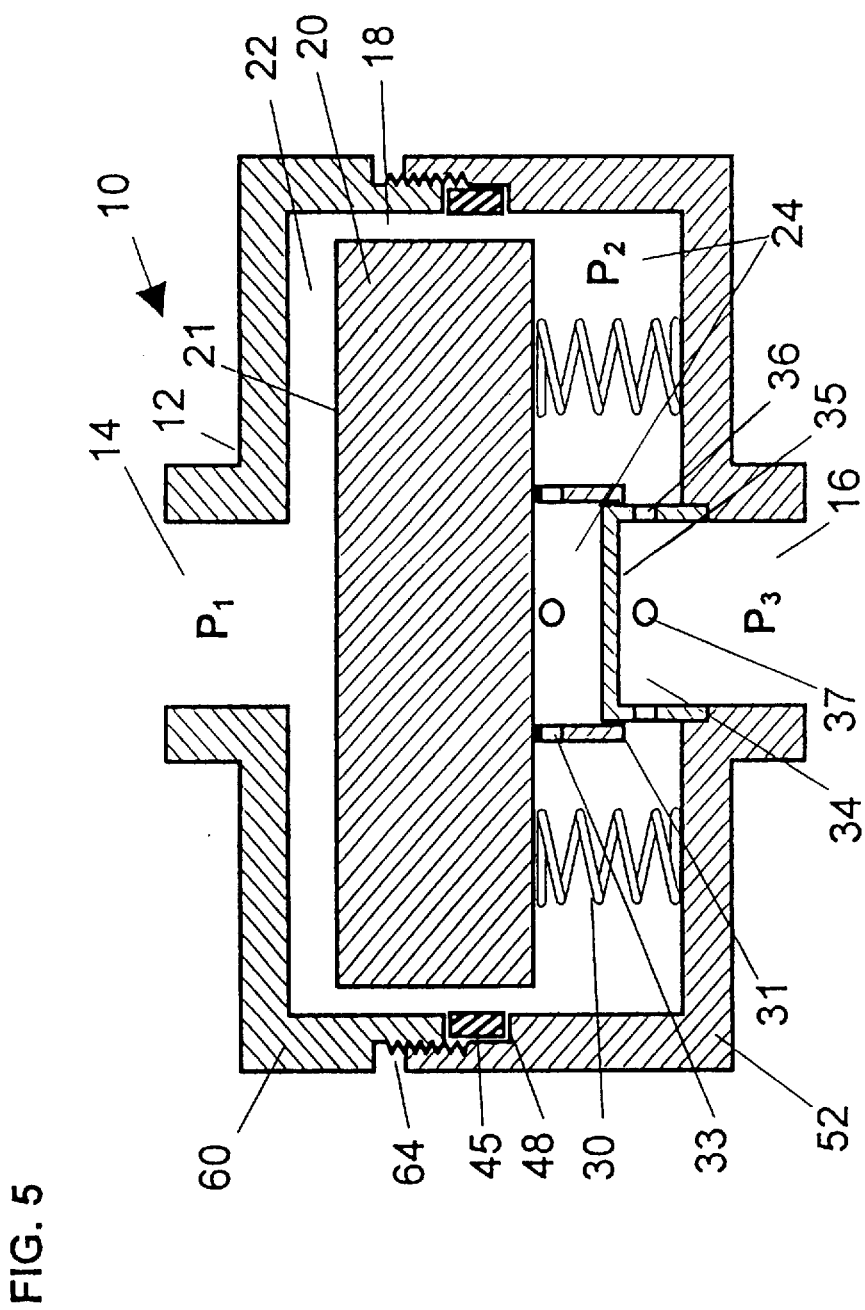
FIG. 5 is a cross-sectional view of the fifth embodiment of the present invention.
Figure 6:
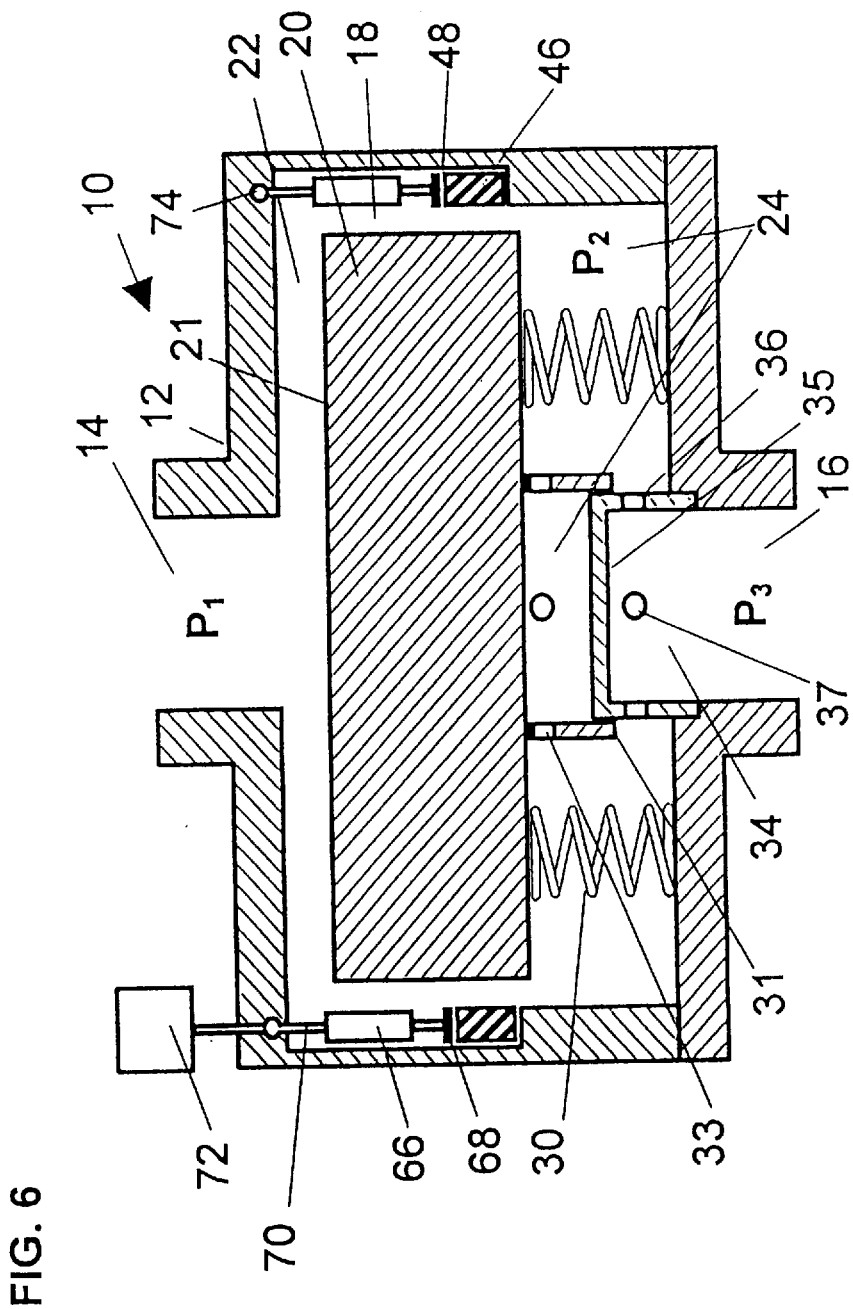
FIG. 6 is a cross-sectional view of the sixth embodiment of the present invention.
Figure 7:
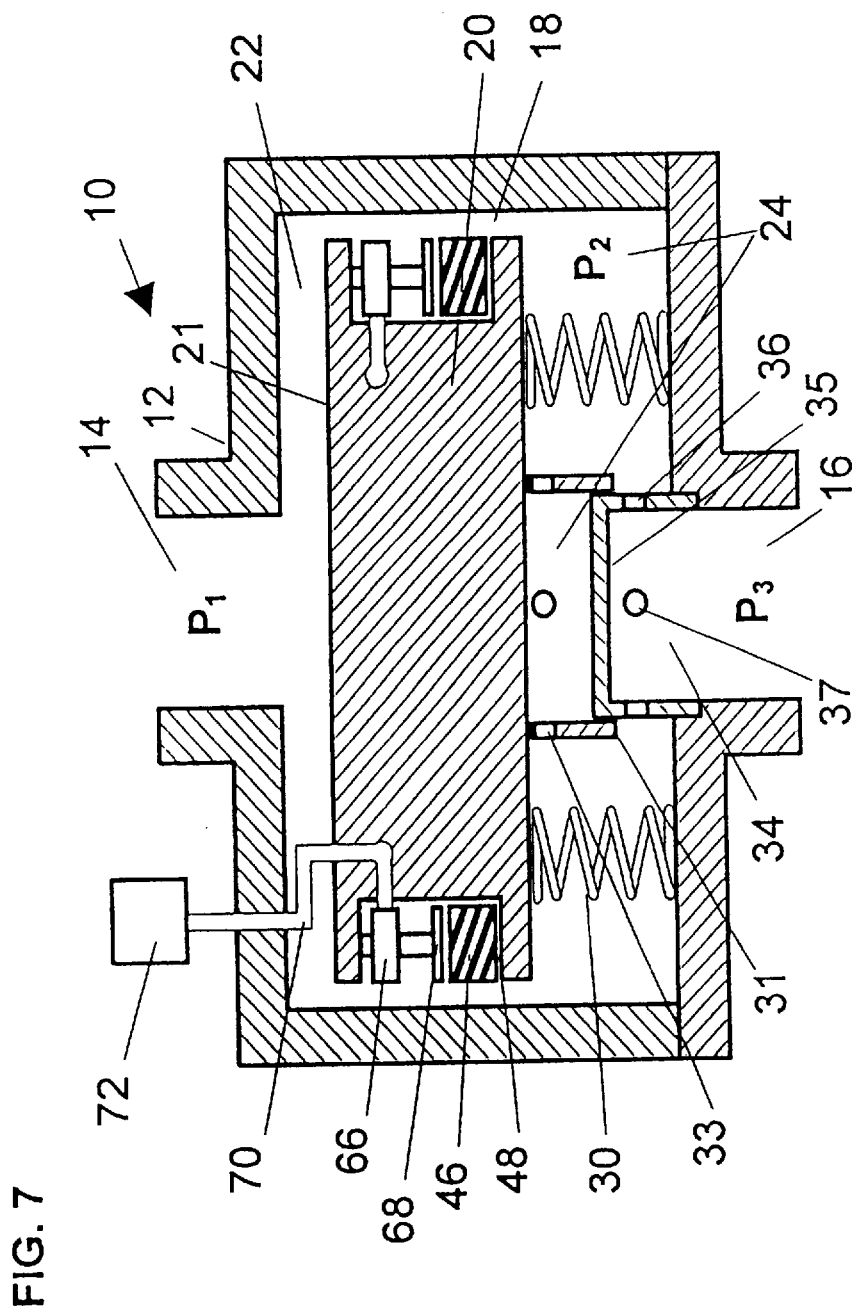
FIG. 7 is a cross-sectional view of the seventh embodiment of the present invention.

Now referring to FIGS. 3, 4, 5, 6 and 7, elastomer ring 46 is circumferentially disposed in a recess 48 around the inner walls of body 12 (FIGS. 1, 3, 5 and 6) or the outer walls of piston 20 (FIGS. 4 and 7). Elastomer ring 46 is preferably comprised of SBR rubber, polychloroprene, EPDM, or neoprene. Elastomer ring 46 is thus a compressible elastic material. Elastomer ring 46 is compressed in width in ways described in further detail below such that the circumference of elastomer ring 46 increases. Elastomer ring 46 can only increase circumferentially into the flow path between the inner walls of body 12 and the outer walls of piston 20 because elastomer ring 46 is fitted in recess 48. As the circumference of elastomer ring 46 is either increased or decreased as the width of elastomer ring 46 conversely decrease or increases, fluid flow through orifice 26 or between the inner walls of body 12 and the outer walls of piston 20 is varied.

In FIGS. 3 and 4, the width of elastomer ring 46 is compressed to increase the circumference thereof by means of compression member 50. Compression member 50 is pressed onto the external surface of elastomer ring 46 to compress the width of elastomer ring 46. A fluid reservoir 52 adjacent compression member 50 communicates via fluid line 54 with fluid source 56. Fluid source 56 contains pressurized fluid such as air, oxygen or water. As pressurized fluid from pressure source 56 increases the fluid pressure within fluid reservoir 52, compressor member 50, which is movable relative to piston 20 or body 12, is forced to press onto elastomer ring 46, thus compressing the width and increasing the circumference of elastomer ring 46 (compressor member 50 may be an annular member).

Referring now to FIG. 5, elastomer ring 46 can be compressed in width to increase its circumference by means of relative movement of top portion 60 of body 12 with respect to bottom portion 62 of body 12. Top portion 60 and bottom portion 62 are threadedly engaged by threads 64 such that the relative longitudinal dimension of body 12 can be varied. The longitudinal dimension of body 12 is decreased as top portion 60 is screwed into bottom portion 62, and the width of elastomer ring 46 is decreased and the circumference is increased to alter fluid flow as top portion 60 presses onto the exterior surface of elastomer ring 46.

Now referring to FIGS. 6 and 7, elastomer ring 46 can be compressed in width to increase its circumference by means of fluid pistons 66. Fluid pistons 66 press compression plate 50 against the exterior surface of elastomer ring 46 to compress elastomer ring 46 against the walls forming recess 48. One of fluid pistons 66 is connected via fluid line 70 to fluid source 72, which contains pressurized fluid such as air, oxygen or water. The remaining fluid pistons 6 are connected to fluid line 70 by manifold 74. One of fluid pistons 66 is connected via fluid line 70 to fluid source 72, which contains pressurized fluid such as air, oxygen or water. The remaining fluid pistons 66 are connected to fluid line 70 by manifold 74.

Figure 8:
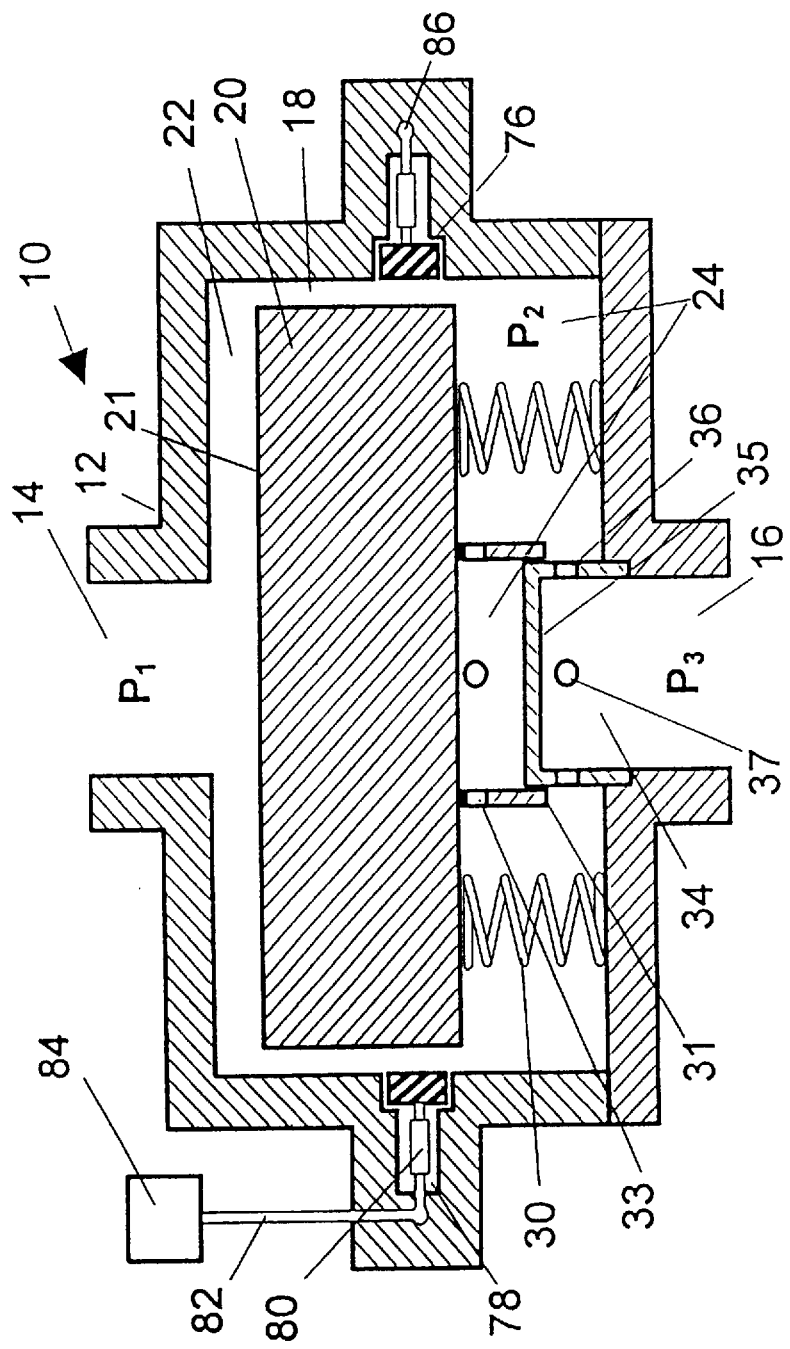
FIG. 8 is a cross-sectional view of the eighth embodiment of the present invention.
Figure 9:
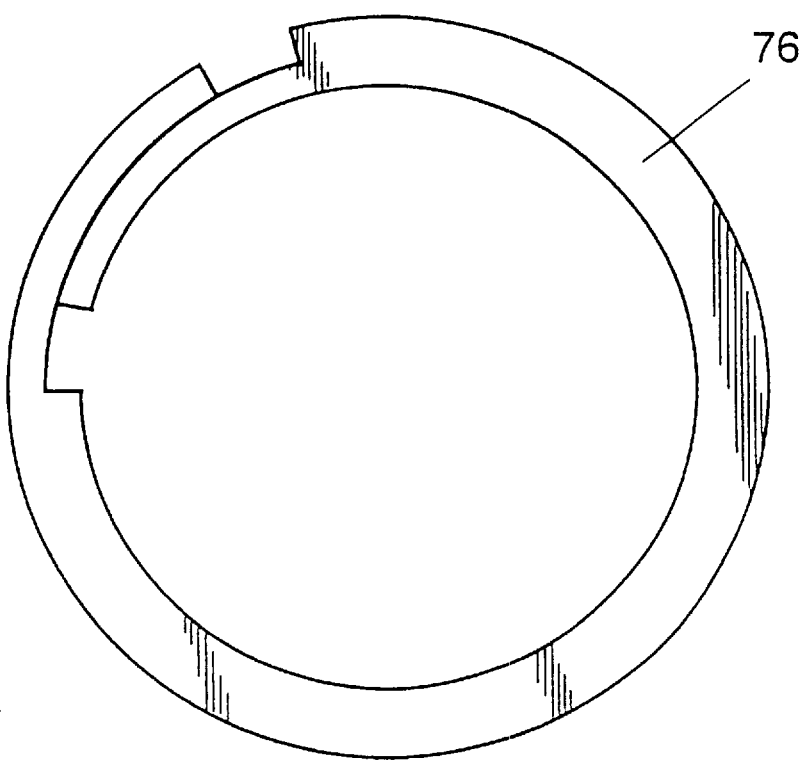
FIG. 9 is a top view of the split ring of the eighth embodiment of FIG. 8.

Now referring to FIGS. 8 through 16 circumferentially alterable ring 76 is employed to vary fluid flow through the flow path between the inner walls of body 12 and the outer walls of piston 20. Ring 76 is preferably substantially rigid, but can be circumferentially varied. Ring 76 is preferably comprised of a metal alloy such as stainless steel, steel, or brass; or a polymer such as rubber, EPDM, or polychloroprene that returns to its original configuration after being circumferentially altered. Ring 76 can be an uninterrupted ring, or may be a split ring as shown in FIG. 9. When split, one end of ring 76 can be secured to body 12 or piston 20, or both ends may be free. The circumference of ring 76 is varied in the manners described below.

Referring specifically to FIGS. 8 and 9, ring 76 is located in recess 78 of body 12. Fluid pistons 80 are also located in recess 78. Fluid pistons 80 are radially disposed around, and contact, the outer circumference of ring 76 to force ring 76 toward the outer wall of piston 20 to alter fluid flow. One of fluid pistons 80 is connected via fluid line 82 to fluid source 84, which contains pressurized fluid such as air, oxygen or water. The remaining fluid pistons 80 are connected to fluid line 82 by manifold 86.

Figure 10:
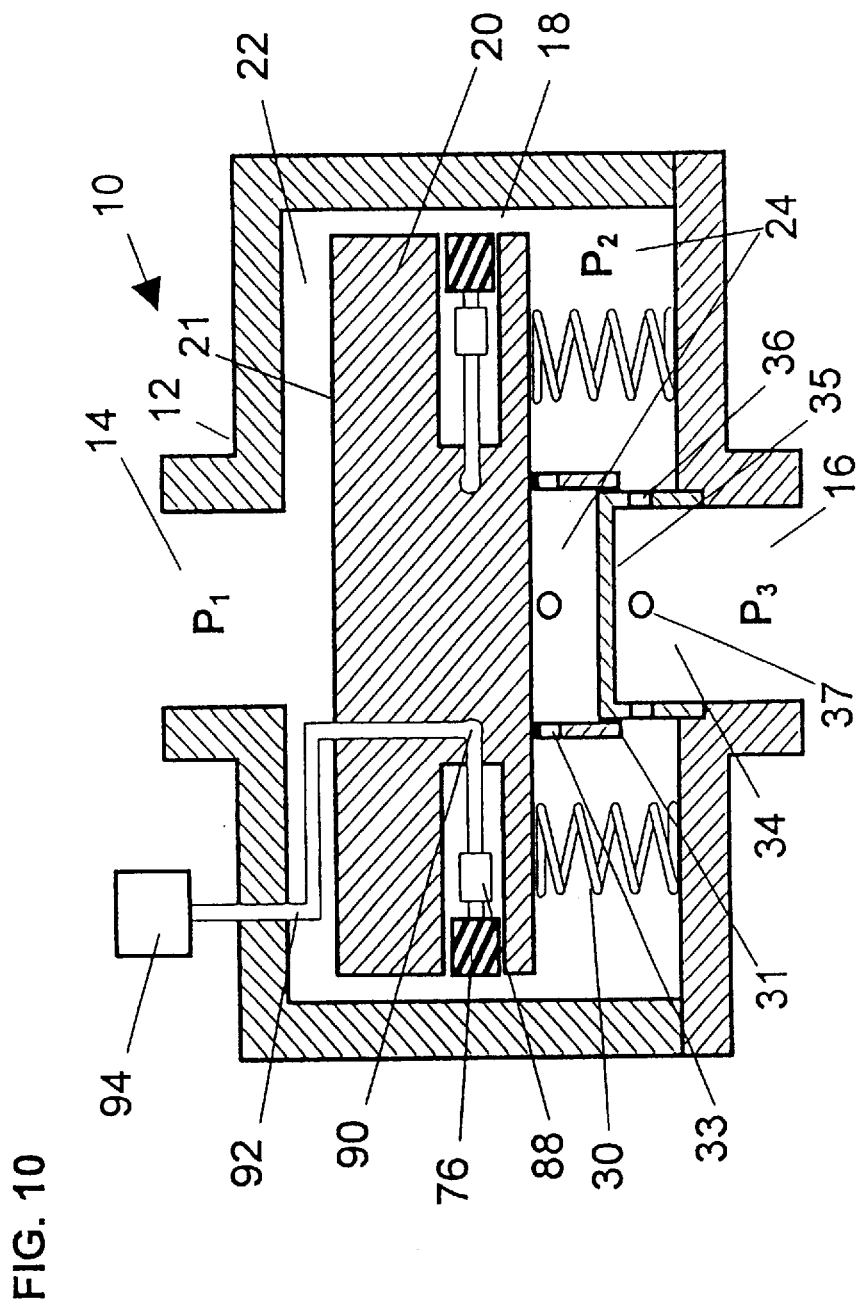
FIG. 10 is a cross-sectional view of the ninth embodiment of the present invention.
Figure 11:
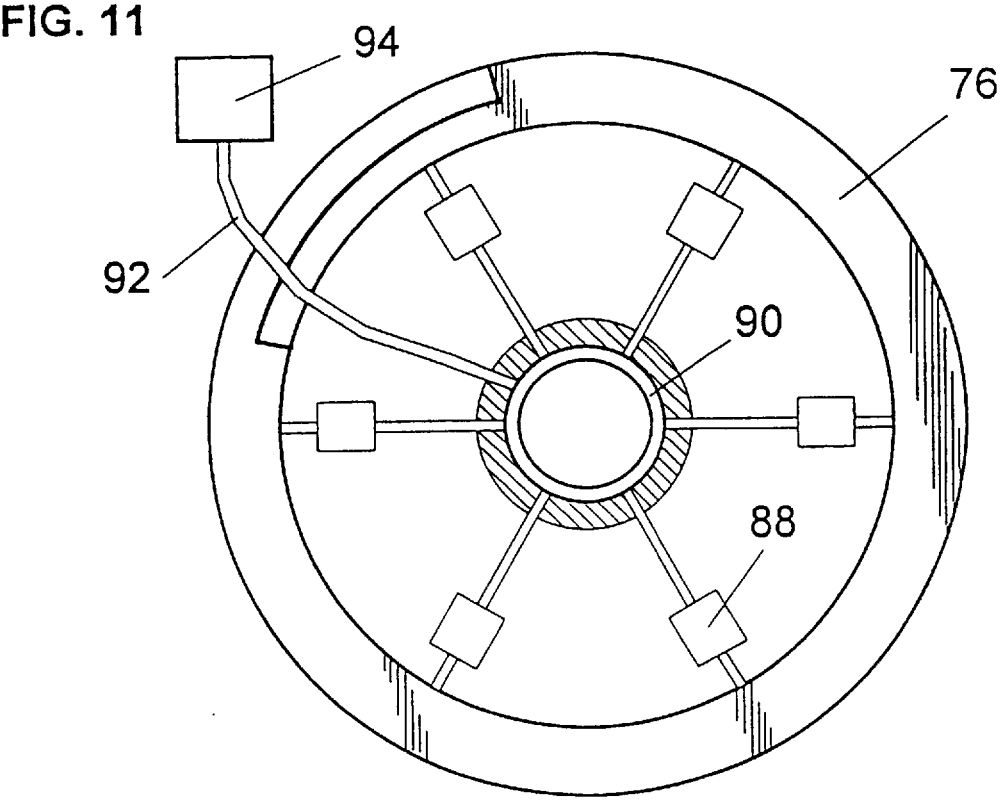
FIG. 11 is a top view of a first piston mechanism of the ninth embodiment of FIG. 10.
Figure 12:
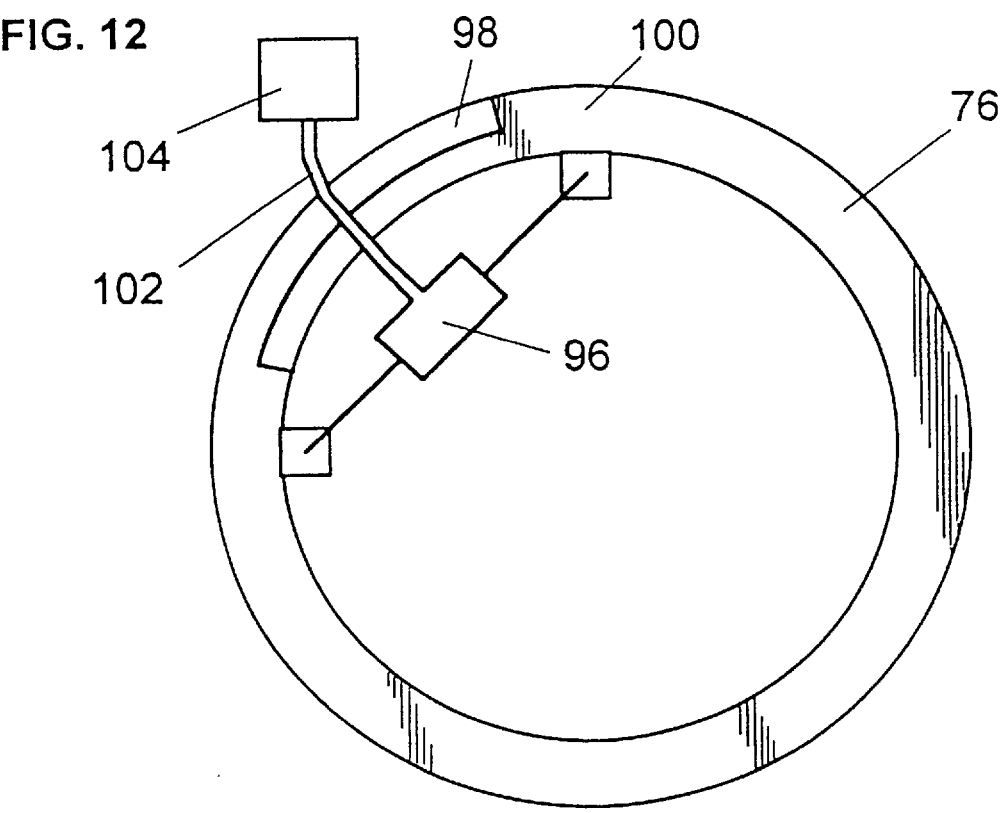
FIG. 12 is a top view of a second piston mechanism of the ninth embodiment of FIG. 10.

Referring to FIGS. 10 through 12, fluid pistons 88 and ring 76 are located on top of piston 20. As shown in FIGS. 10 and 11, fluid pistons 88 can be radially disposed within and contacting the inner circumference of ring 76 to force ring 76 toward the inner wall of body 12 to alter fluid flow. Pistons 88 are connected to manifold 90 which, in turn, communicates with fluid line 92. Fluid line 92 is connected to fluid source 94, which contains pressurized fluid such as air, oxygen or water.

Alternatively, as shown in FIG. 12, a single piston 96, attached to the two split ends 98 and 100, of ring 76 can be employed to alter the circumference of ring 76 to vary fluid flow. Piston 96 is connected to fluid line 102 which, in turn communicates with fluid source 104. Fluid source 104 contains pressurized fluid such as air, oxygen or water.

Figure 13:
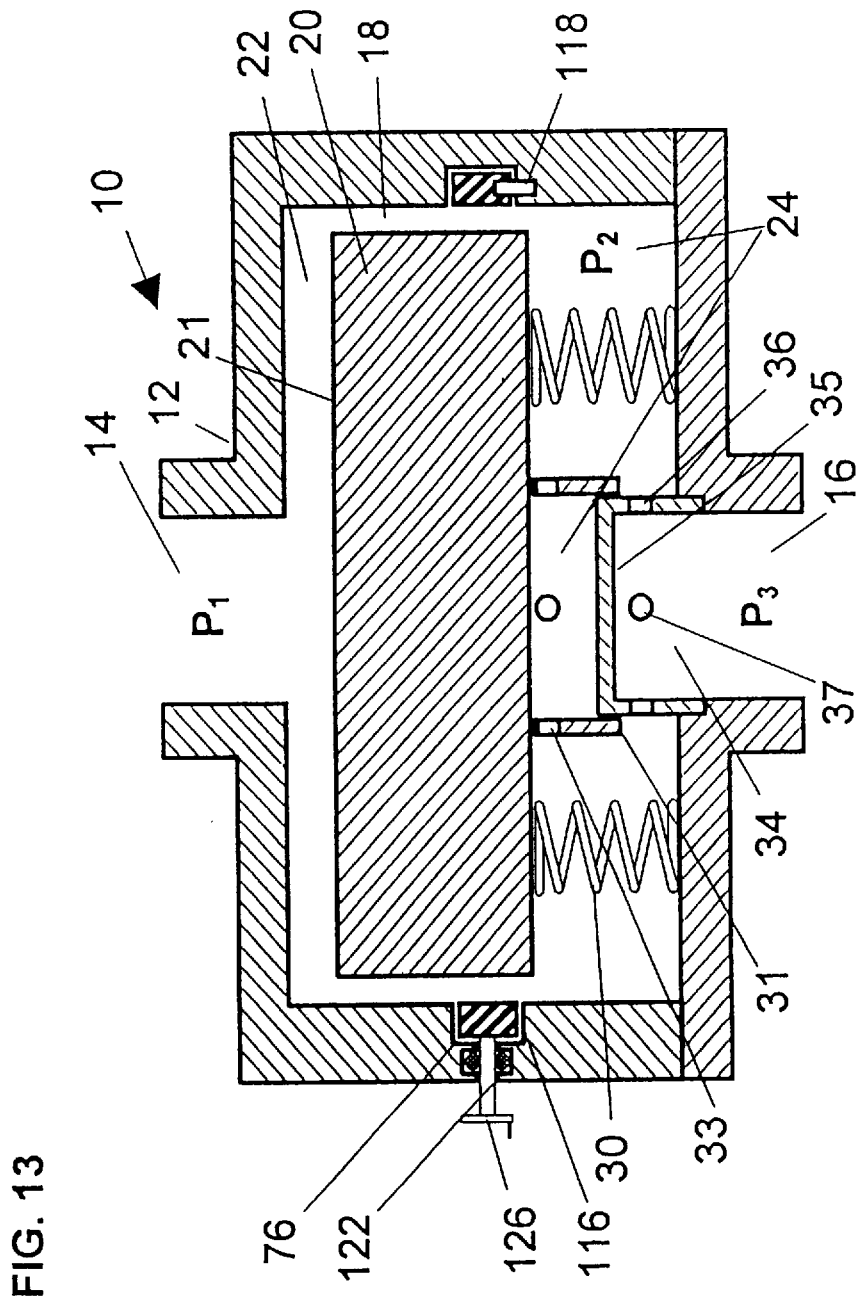
FIG. 13 is a cross-sectional view of the tenth embodiment of the present invention.
Figure 14:
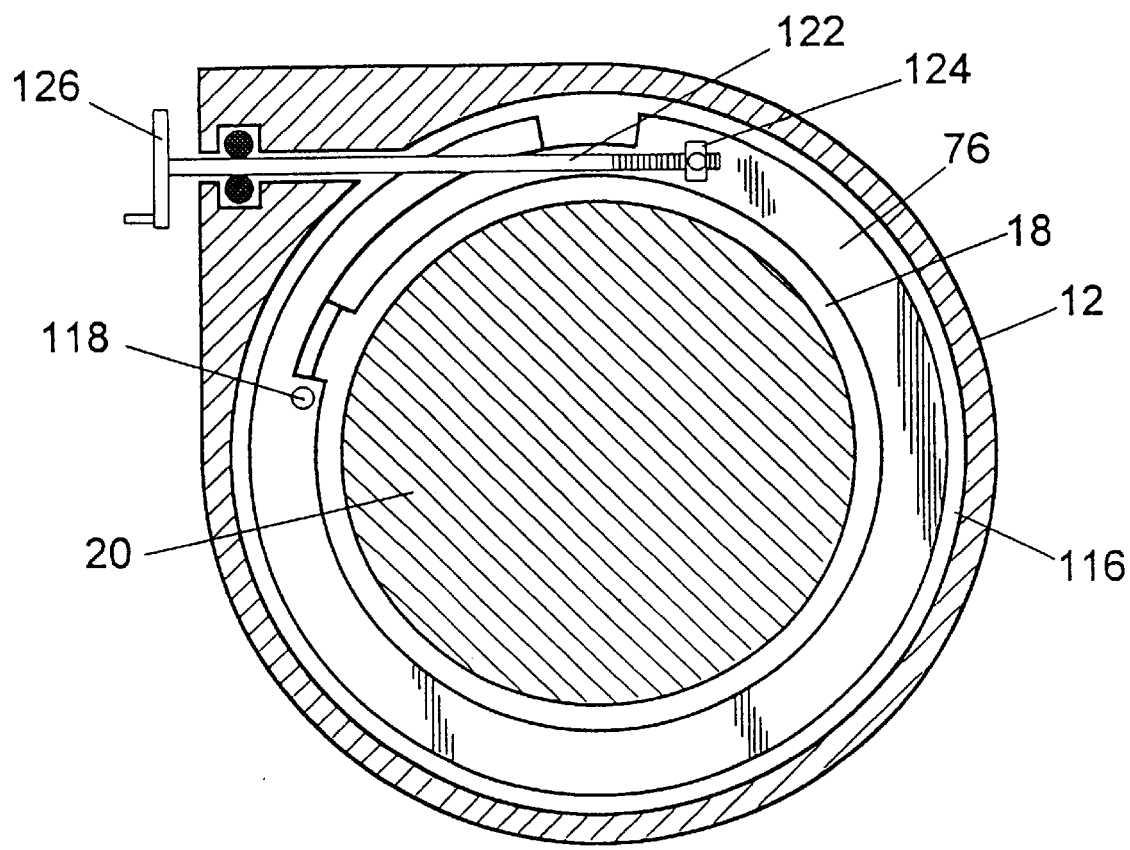
FIG. 14 is a top view of the tenth embodiment of the present invention.

Referring to FIGS. 13 and 14, ring 76 is located in recess 116 of body 12. Ring 76 is a split ring having end 118 fixedly secured to body 12 by, for example, bolt 120. Flange 124 is pivotally attached to one of shaft 122 and ring 76, and is fixedly connected to the other of shaft 122 and ring 76. Shaft 122 is threadedly connected to nut 126. As shaft 122 is rotated by turning handle 126, the threaded connection between shaft 122 and nut 126 moves shaft 122 relative to nut 126. This movement of shaft 122 moves end 118 of ring 76 due to the connection of flange 124 to ring 76 and to shaft 122, thus altering the circumference of ring 76 to vary the fluid flow between the inner walls of body 12 and the outer walls of piston 20.

Figure 15:
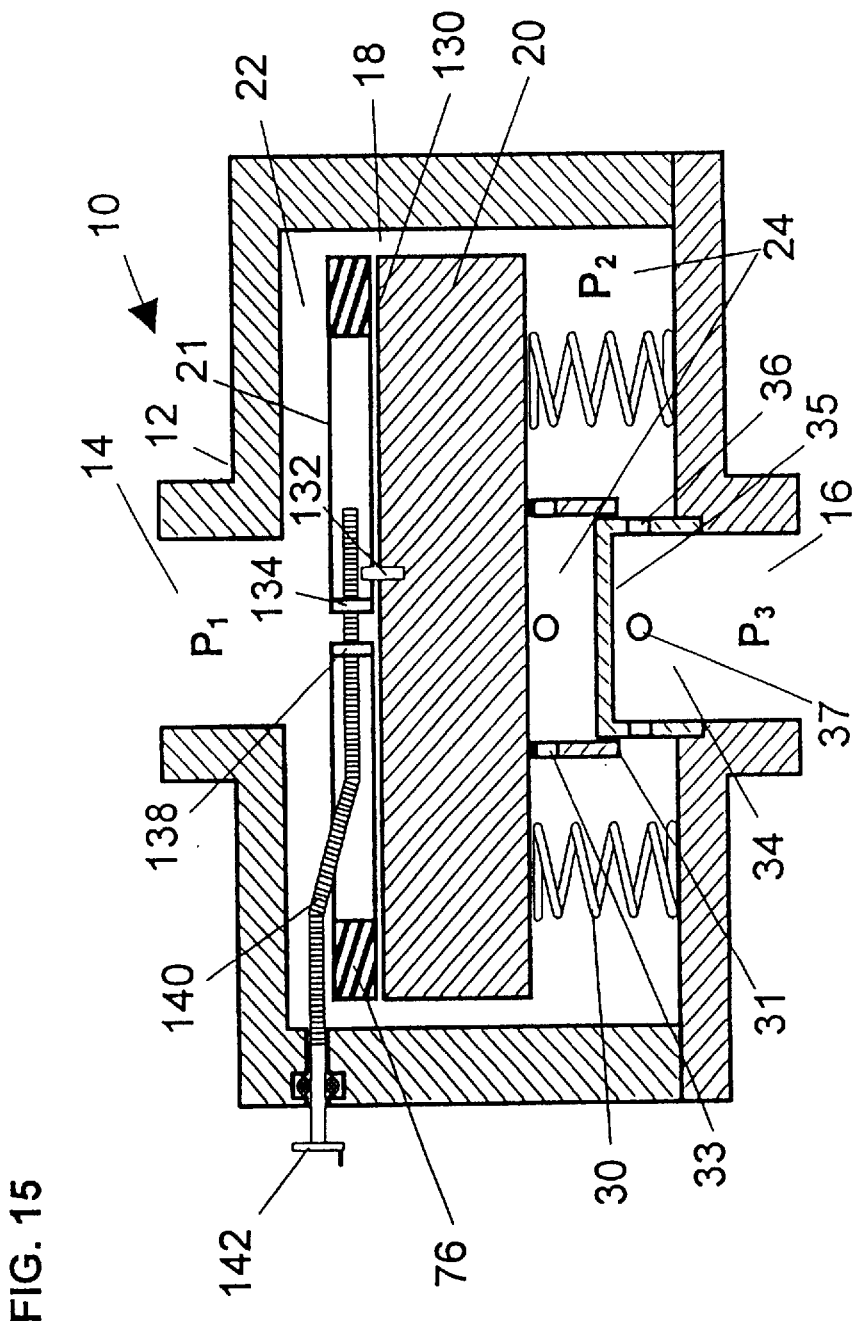
FIG. 15 is a cross-sectional view of the eleventh embodiment of the present invention.
Figure 16:
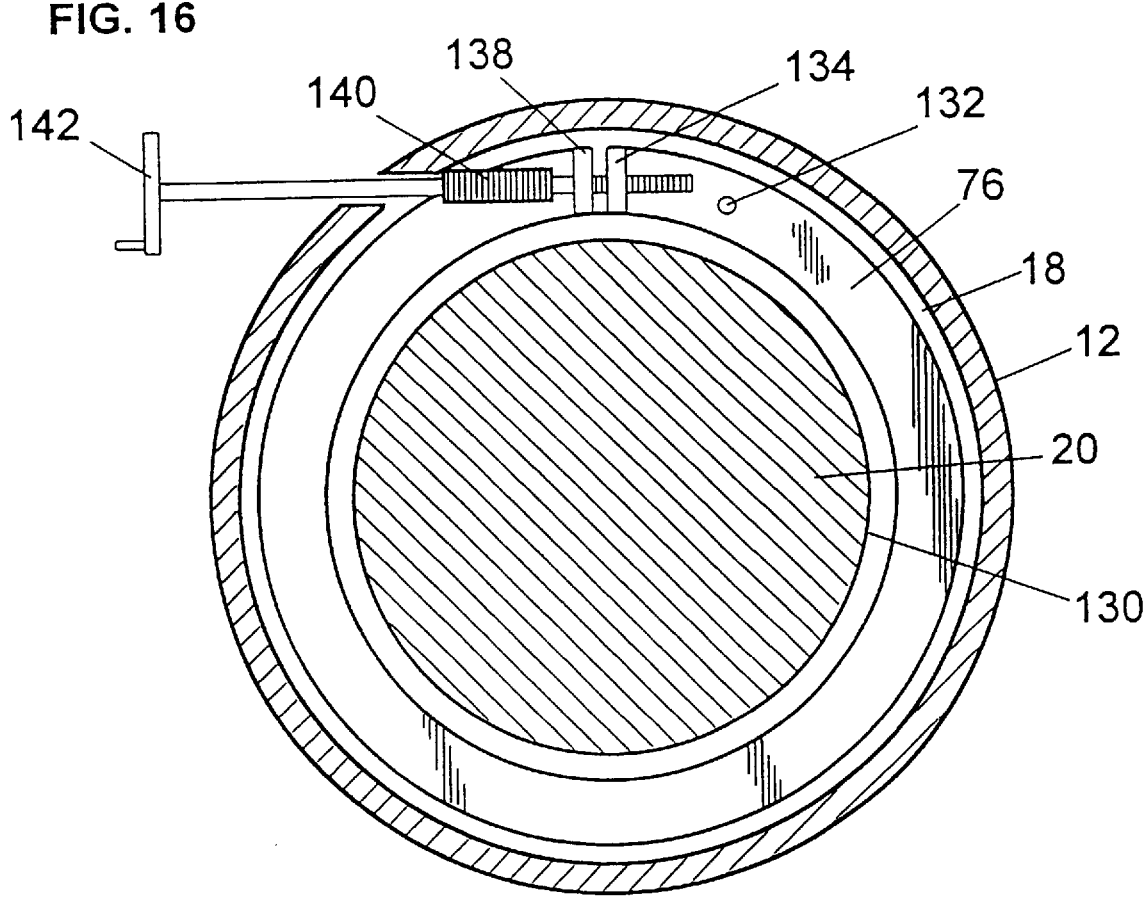
FIG. 16 is a top view of the eleventh embodiment of the present invention.

Referring to FIGS. 15 and 16, ring 76 is located on top of piston 20. Ring 76 is a split ring having end 130 fixedly secured to piston 20 by, for example, bolt 132. Flanges 134 and 138 are located on ends 130 and 136, respectively, of ring 76. Flexible shaft 140 threadedly passes through flanges 134 and 138. As shaft 140 is rotated by turning handle 142, the threaded connection between shaft 140 and flanges 134 and 138 moves free end 136 of ring 76 relative to fixed end 130 of ring 76, thus altering the circumference of ring 76 to vary the fluid flow between the inner walls of body 12 and the outer walls of piston 20.

While particular embodiments of the present invention have been described in some detail herein above, changes and modifications may be made in the illustrated embodiments without departing from the spirit of the invention.

I claim:

1. A valve comprising:
   a housing having an inlet and an outlet defining a flow passage through said valve body, and having an inner wall;
   a piston mounted in a bore intersecting said flow passage, said piston having an outer wall and dividing said bore into first and second chambers;
   means for biasing said piston against fluid pressure from said first chamber;
   a sleeve on said piston and in said second chamber, said sleeve having an opening therein for entry of fluid pressure into said sleeve;
   a cover over said outlet in said second chamber, said cover having an opening therein for passage of fluid through said cover and through said outlet, said sleeve aligned to variably sheath said cover upon reciprocation of said piston during initiation of fluid flow through said valve and thereby vary the effective area of said cover opening to achieve the desired pressure differential across said piston; and
   means encircling at least one of said inner wall of said housing and said outer wall of said piston and having an alterable cross-sectional area for altering fluid flow between said inner wall of said housing and said outer wall of said piston.

2. The valve of claim 1 wherein said means for altering fluid flow is on said inner wall of said housing.

3. The valve of claim 1 wherein said means for altering fluid flow is on said outer wall of said piston.

4. The valve of claim 1 wherein said means for altering fluid flow is an inflatable bladder.

5. The valve of claim 4 wherein said inflatable bladder is ring-shaped.

6. The valve of claim 4 wherein said inflatable bladder is inflated and deflated by a pressurized fluid source.

7. The valve of claim 1 wherein said means for altering fluid flow is a deformable elastomer.

8. The valve of claim 7 wherein said deformable elastomer is ring-shaped.

9. The valve of claim 7 wherein said elastomer is deformed by a pressurized fluid source.

10. The valve of claim 7 wherein said elastomer is deformed by piston means.

11. The valve of claim 7 wherein said housing is divided into a first portion and a second portion threadedly interconnected with said first portion, said elastomer being deformed by relative movement of a said first portion of said housing with respect to said second portion of said housing.

12. The valve of claim 1 wherein said means for altering fluid flow is a circumferentially variable ring.

13. The valve of claim 12 wherein said ring is unitary in construction.

14. The valve of claim 12 wherein said ring is split at one portion thereof.

15. The valve of claim 14 wherein said ring has one end secured to said valve.

16. The valve of claim 12 wherein the circumference of said ring is altered by piston means.

17. The valve of claim 12 wherein the circumference of said ring is altered by screw means.

18. The valve of claim 1 wherein said sleeve is tubular and said cover is cylindrical.

19. The valve of claim 1 wherein a plurality of sleeve openings are present.

20. The valve of claim 1 wherein a plurality of cover openings are present.

21. The valve of claim 1 wherein registration of said sheath of said piston and said cover guides reciprocation of said piston.

22. A valve comprising:
    a housing having an inlet and an outlet defining a flow passage through said valve body, and having an inner wall;
    a piston mounted in a bore intersecting said flow passage, said piston having an outer wall and dividing said bore into first and second chambers;
    means for biasing said piston against fluid pressure from said first chamber;
    a sleeve on said piston and in said second chamber, said sleeve having an opening therein for entry of fluid pressure into said sleeve;
    a cover over said outlet in said second chamber, said cover having an opening therein for passage of fluid through said cover and through said outlet, said sleeve aligned to variably sheath said cover upon reciprocation of said piston during initiation of fluid flow through said valve and thereby vary the effective area of said cover opening to achieve the desired differential pressure across said piston whereby registration of said sheath of said piston and said cover guides reciprocation of said piston; and
    means encircling at least one of said inner wall of said housing and said outer wall of said piston and having an alterable cross-sectional area for altering fluid flow between said inner wall of said housing and said outer wall of said piston.

23. A valve comprising:
    a housing having an inlet and an outlet defining a flow passage through said valve body, and having an inner wall;
    a piston mounted in a bore intersecting said flow passage, said piston having an outer wall and dividing said bore into first and second chambers;
    means for biasing said piston against fluid pressure from said first chamber;
    a sleeve on said piston and in said second chamber, said sleeve having an opening therein for entry of fluid pressure into said sleeve;
    a cover over said outlet in said second chamber, said cover having an opening therein for passage of fluid through said cover and through said outlet, said sleeve aligned to variably sheath said cover upon reciprocation of said piston during initiation of fluid flow through said valve and thereby vary the effective area of said cover opening to achieve the desired differential pressure across said piston; and
    means encircling at least one of said inner wall of said housing and said outer wall of said piston and having an alterable cross-sectional area for altering fluid flow between said inner wall of said housing and said outer wall of said piston and comprising an inflatable bladder.

* * * * *